United States Patent [19]

Koberstein et al.

[11] Patent Number: 5,001,103

[45] Date of Patent: Mar. 19, 1991

[54] RHODIUM-FREE THREE-WAY CATALYST

[75] Inventors: Edgar Koberstein, Alzenau; Bernd Engler, Hanau; Rainer Domesle, Maintal; Herbert Voelker, Hanau, all of Fed. Rep. of Germany

[73] Assignee: Degussa Aktiengesellschaft, Frankfurt am Main, Fed. Rep. of Germany

[21] Appl. No.: 263,695

[22] Filed: Oct. 28, 1988

[30] Foreign Application Priority Data

Oct. 30, 1987 [DE] Fed. Rep. of Germany ....... 3736810

[51] Int. Cl.$^5$ .......................... B01J 21/04; B01J 23/10; B01J 23/42; B01J 23/44
[52] U.S. Cl. .................................... 502/262; 502/303; 502/304
[58] Field of Search ...................... 502/304, 262, 303; 423/213.5

[56] References Cited

U.S. PATENT DOCUMENTS

| | | | |
|---|---|---|---|
| 3,993,572 | 11/1976 | Hindin et al. | 502/304 |
| 4,171,287 | 10/1979 | Keith | 502/304 |
| 4,316,822 | 2/1982 | Fujitani et al. | 423/213.5 X |
| 4,587,231 | 5/1986 | Sawamura et al. | 502/304 |
| 4,678,770 | 7/1987 | Wan et al. | 502/302 X |

Primary Examiner—W. J. Shine
Attorney, Agent, or Firm—Beveridge, DeGrandi & Weilacher

[57] ABSTRACT

The invention is a three-way catalyst of active aluminum oxide, palladium, platinum and cerium dioxide. If $Al_2O_3$ is present as bulk carrier, the catalyst contains 5–20% by weight $CeO_2$ and if $Al_2O_3$ is present as a coating on a honeycombed, inert carrier, it contains 25–50% by weight $CeO_2$.

4 Claims, No Drawings

RHODIUM-FREE THREE-WAY CATALYST

The invention relates to a catalyst with an active phase applied to aluminum oxide of the transition series and consisting of 0.03-3% by weight palladium and platinum with a weight ratio between palladium and platinum of 0.1:1 to 10:1 and also includes a cerium dioxide content. The weight amounts of noble metal, cerium dioxide and aluminum oxide constitute 100%. The catalyst is obtained by impregnating an optionally lattice-stabilized carrier material with an aqueous solution of a salt of palladium and platinum, drying and tempering at temperatures above 250° C., optionally in a gas current containing hydrogen.

As a result of the sharp rise in the price of rhodium recently and the uncertainty of the supply, the producers of catalysts for cleaning the exhaust gases of internal combustion engines perceived the need of developing catalytic compositions which exhibit, without using rhodium, an equivalent conversion of the pollutants CO and hydrocarbons contained in the exhaust gases of internal combustion engines and a conversion of nitrogen oxides contained therein sufficient for practical application.

It was found that a replacement of the rhodium is possible in catalysts which contain both palladium as well as platinum, with retention of the customary amounts of noble metals, if the high $CeO_2$ amount of the invention is also present in the carrier material.

Catalysts containing both platinum and palladium have long been known for reducing pollutant emissions; however, the action of such catalysts consisted solely in removing CO and hydrocarbons by oxidation. It was not until the use of high $CeO_2$ amounts in the carrier material in accordance with the invention that Pt/Pd catalysts were obtained which exhibit the additional capacity of reducing nitrogen, oxides. This capacity was previously attributed only to the very expensive rhodium and to iridium, which is scarcely available, and for that reason all three-way catalysts had to and did contain rhodium for the simultaneous conversion of CO, hydrocarbons and nitrogen oxides.

The subject matter of the invention is a catalyst with an active phase applied to aluminum oxide of the transition series and consisting of 0.03-3% by weight palladium and platinum with a weight ratio between palladium and platinum of 0.1:1 to 10:1 as well as with a cerium dioxide content, whereby the weight amounts of noble metal, cerium dioxide and aluminum oxide constitute 100%, obtained by impregnating the optionally lattice-stabilized carrier material with an aqueous solution of a salt of palladium and platinum, drying and tempering at temperatures above 250° C., optionally in a gas current containing hydrogen.

The catalyst is characterized in that it contains 5-20, preferably 11-20% by wt. cerium dioxide when the aluminum oxide is present in bulk form and 25-50% by wt. cerium dioxide when the aluminum oxide is present as a coating on a honeycombed, inert carrier of ceramics or metal, in which instance the aluminum oxide is impregnated with an aqueous solution of cerium salt before the impregnation with the solution of palladium salt and platinum salt or, if the aluminum oxide is present on a honeycombed, inert carrier, it is also mixed in the aluminum oxide as cerium compound in solid form. The catalytic precursor obtained is then tempered in air at 300°-950° C., preferably 600°-700° C.

The present invention differentiates the amounts of cerium dioxide for the first time as a function of the embodiment of the aluminum oxide as coating (wash coat) on an inert, monolithic or honeycombed carrier or as formed bulk material (balls, extruded blanks, tablets or the like). It was found that both species should be doped differently because of different diffusion conditions in bulk bodies and in wash coats.

All crystal modifications of $Al_2O_3$ (individually or in a mixture) with the exception of $\alpha$-$Al_2O_3$ are potential aluminum oxide of the transition series. The specific surface according to BET can be between 40 and 250 $m^2/g$.

The bulk weight of formed bulk material of the provided, active, catalyst-furthering aluminum oxide is on the average 500 $kg/m^3$. The cerium dioxide added in by means of impregnation with aqueous cerium salt solutions, drying and calcining permeates the molded aluminum oxide blank in an essentially uniform manner.

In order to achieve the same oxygen storage capacity per volumetric unit of the catalyst by means of cerium dioxide as in the case of aluminum oxide-coated monoliths or honeycombs in which the $Al_2O_3$ content is in the range of 100 $kg/m^3$, the cerium content must be set at a correspondingly lower concentration in relation to that of the monolithic catalyst.

It is surprising that in the triple combination of $Pd/Pt/CeO_2$, the function of the noble metal component can be brought, when using customary amounts of noble metals, to approximately the same level as in the case of customary formulations containing platinum, rhodium and cerium dioxide in so far as the increased amounts of cerium dioxide are used in accordance with the invention. The customary initial materials in the form of water-soluble salts are used for the noble metal components.

An amount of aluminum oxide up to 20% by wt. can be replaced by zirconium dioxide, lanthanum oxide $La_2O_3$, neodymium oxide $Nd_2O_3$, praseodymium oxide $Pr_6O_{11}$ or nickel oxide NiO either as individual substance or as a mixture in the catalysts of the invention for the purpose of increasing the activity, for high temperature resistance, for the so-called lean stability in the case of exhaust gas compositions of $\lambda > 1$ and for endurance strength during operation.

Furthermore, the usage or co-usage of nickel oxide NiO results in an increase of the hydrocarbon conversion in the rich exhaust range and a considerable diminution of the undesirable emission of hydrogen sulfide which occurs in rich operation, that is, at $\lambda < 1$.

Cerium(III)acetate in particular, in addition to cerium nitrate, ammonium cerium nitrate, cerium oxalate, cerium chloride, cerium carbonate, cerium oxide or cerium hydroxide and other cerium salts is especially suitable for introducing the important modification component cerium dioxide $CeO_2$ in the necessary high concentrations. It can be added in the form of aqueous impregnation solutions to the production of bulk catalysts and of monolithic or honeycombed catalysts. It is also possible in the production of the last-named species of mixing in all of the cited compounds in the form of solids to the aluminum oxide.

A proven measure, especially for stabilizing the specific surface of the active aluminum oxide during continuous operation of the catalysts, consists in prestabilizing the lattice of the aluminum oxide by means of alkaline earth metal oxide, silicon dioxide, zirconium dioxide or by oxides of the rare earths. A variant of the invention makes advantageous use thereof.

Furthermore, a measure for separating the two noble metals from one another has proven to be beneficial within the scope of the invention for the retention of the specific individual actions of each metal.

Therefore, it has been found advantageous that during the depositing of the aluminum oxide as coating on an inert honeycombed carrier, the cerium dioxide and optionally the aluminum oxide containing the other components is applied by means of an aqueous suspension in two layers onto the inert carrier. The first layer is impregnated with aqueous platinum salt solution, dried and optionally tempered as an intermediate step and the second layer is impregnated with aqueous palladium salt solution and dried. The catalytic precursor obtained is then tempered, optionally in a current of gas containing hydrogen.

There is further constituted the use of the catalyst for the simultaneous conversion of carbon monoxide, hydrocarbons and nitrogen oxide from the exhaust gases of internal combustion engines.

The invention is described in more detail in the following examples of embodiments.

EXAMPLE 1

A honeycombed body of cordierite with 62 cells/cm$^2$, 102 mm in diameter and 152 mm long was coated by immersion in a 35 % aqueous suspension which contained $\gamma$-$Al_2O_3$ (140 m$^2$/g), cerium(III)acetate and zirconyl acetate and in which these substances, calculated as oxides, were present in a ratio of $Al_2O_3$:$CeO_2$:$ZrO_2$=58:39:3. Excess suspension was removed by being blown out and the coated monolith was tempered after drying at 120° C. for 2 hours at 600° C., whereby $CeO_2$ and $ZrO_2$ were produced from the acetates. The applied coating was composed of 128 g $Al_2O_3$, 86 g $CeO_2$ and 7 g $ZrO_2$. The honeycombed body coated in this manner was subsequently covered by impregnation with an aqueous solution containing 0.59 g Pd in the form of $Pd(NO_3)$ and 1.18 g Pt in the form of $H_2PtCl_6$.

After the drying of the monolith impregnated with noble metal, a 4 hour reduction took place in forming gas ($N_2$:$H_2$=95:5) at 550° C.

EXAMPLE 2

A catalyst according to Example 1 was produced except that 0.88 g Pd and 0.88 g Pt were applied.

EXAMPLE 3 (reference example)

A honeycombed body was provided with an oxide layer as described in Example 1. Then, 1.47 g Pt in the form of $H_2PtCl_6$ and 0.29 g Rh in the form of $RhCl_3$ were applied by impregnation by the same method instead of Pd and Pt.

EXAMPLE 4 (reference example)

A ceramic honeycombed body according to Example 1 was coated with a 30% aqueous suspension containing $CeO_2$, added as $Ce(NO_3)_3$, and $\gamma$-$Al_2O_3$ (140 m$^2$/g) in a ratio of 5:95. After tempering, 152 g $Al_2O_3$ and 8 g $CeO_2$ were present on the monolith. The remaining production parameters corresponded to Example 1.

EXAMPLE 5

Cylindrical test specimens 38 mm in diameter were bored out of the catalysts produced according to Examples 1–4 parallel to the cells, built into a multi-chamber test reactor and checked as to their function as three-way catalyst in the exhaust current of an internal combustion engine.

The test engine was a 4-cylinder injection engine with a cubic capacity of 1781 cm$^3$ provided with a K-JETRONIC [continuous-injection system] of the Bosch firm.

In order to evaluate the low temperature activity of the catalysts, that temperature was determined at which 50% of the carbon monoxide, of the hydrocarbons and of the nitrogen oxides contained in the exhaust current are converted at $\lambda$=0.995.

In addition, the catalytic activity was measured at 450° C. in a dynamic test at a wobble frequency of 1 Hz and a $\lambda$ measure of deviation of 0.034.

The space velocity thereby was 64000 h$^{-1}$. The composition of the exhaust varied as follows in front of the catalyst:

| | |
|---|---|
| CO | 2.4–1.4% by vol. |
| HC | 450–350 ppm |
| $NO_X$ | 2500–2000 ppm |
| $O_2$ | 1.0% by vol. |
| $CO_2$ | 13–14% by vol. |

In order to determine the endurance behavior, the catalysts were operated 100 hours on the engine at exhaust temperatures between 450 and 850° C.

The results of these tests with the catalysts of the invention together with those of the reference catalysts are contained in Table 1.

As the measured values show, the Pt/Pd catalysts of the invention according to Examples 1 and 2 are equally efficient as the Pt/Rh catalyst of reference Example 3 in the especially important dynamic conversion both in a fresh state as well as after 100 hours of engine ageing. Disadvantages in relation to the Pt/Rh three-way catalyst are present only during the starting behavior both in a new state as also after ageing. However, these disadvantages are not so serious, especially considering the very good results in the dynamic conversion, that they would contradict the use of Pt/Pd catalysts of the invention as three-way catalysts in practice.

Reference Example 4 corresponds in its formulation of catalysts to a commercially available Pt/Pd oxidation catalyst with low $CeO_2$ content and differs from the three-way catalyst of the invention by its intended application and the sharply altered $CeO_2$ concentration in the carrier material.

The catalytic activity of such a commercially available oxidation catalyst in the three-way catalyst test employed here is distinctly lower, especially as concerns the conversion of $NO_X$, than that of the Pt/Pd catalysts with high cerium contents of the invention according to Examples 1 and 2. Based on this result, the Pt/Pd catalysts with low $CeO_2$ content provided expressly for oxidation purposes are not suitable in practice for use as three-way catalysts whereas the catalysts of the invention according to Examples 1 and 2 exhibit a catalytic activity which is still sufficient for this application.

The following Examples 6–8 are intended to show that the Pt/Pd three-way catalysts of the invention exhibit an even higher catalytic activity than commercially available Pt/Rh three-way catalysts described e.g. in German patent 29 07 106.

EXAMPLE 6

A ceramic monolith with 62 cells/cm$^2$, 102 mm in diameter and 152 mm long was covered by immersion with a suspension containing $\gamma$-Al$_2$O$_3$ (150 m$^2$/g), cerium acetate and zirconyl nitrate in a ratio of the oxides of Al$_2$O$_3$:CeO$_2$:ZrO$_2$ = 65:28:7.

After the excess suspension had been blown out, the coated honeycombed body was dried at 120° C. and activated 1 hour at 900° C.

The coating amount was 145 g Al$_2$O$_3$, 62 g CeO$_2$ and 15.5 g ZrO$_2$. There were applied 0.69 g Pd in the form of PdCl$_2$ and 1.39 g Pt in the form of H$_2$PtCl$_6$ by impregnation from aqueous solution onto this monolith provided with carrier material. Following the drying of the impregnated form body at 150° C., a two-hour reduction took place at 500° C. in a hydrogen current.

EXAMPLE 7 (reference example)

The reference catalyst corresponded in dimensions and production conditions to the catalyst specimen of Example 6. However, the composition of the carrier material differed in that 139 g Al$_2$O$_3$, 10 g CeO$_2$, 12 g ZrO$_2$ and 6 g Fe$_2$O$_3$, were applied from an aqueous suspension of $\gamma$-Al$_2$O$_3$ (150 m$^2$/g), cerium acetate, zirconyl acetate and iron oxide Fe$_2$O$_3$ and that 1.47 g Pt in the form of H$_2$PtCl$_6$ and 0.29 g Rh in the form of Rh(NO$_3$)$_3$ were impregnated on.

EXAMPLE 8

The catalysts produced according to Examples 6 and 7 were tested one after the other in the exhaust current of an Otto engine for their effectiveness as three-way catalyst. The test conditions corresponded to those described in Example 6 with the exception that in order to determine the dynamic conversion, a $\lambda$ measure of deviation of 0.068 and a space velocity of 73000 h$^{-1}$ were taken as the basis.

The following exhaust composition was present:

| | |
|---|---|
| CO | 3.3–2.2% by vol. |
| HC | 510–420 ppm |
| NO$_X$ | 1500–2100 ppm |
| O$_2$ | 1.6% by vol. |
| CO$_2$ | 12–13% by vol. |

The pollutant conversions of the catalysts were measured in the fresh state, after 24 hours tempering in air at 950° C. and after a further 100 hours of engine ageing. See Table 2.

In the fresh state, the Pt/Pd catalyst of the invention exhibits comparably high conversion rates in the dynamic test in comparison to the Pt/Rh reference catalyst. It exhibits advantages during the starting behavior as regards CO and HC (lower temperatures at the 50% conversion) but disadvantages as regards nitrogen oxides.

Subsequently, the same catalysts were tempered 24 hours at 950° C. in air in order to test the catalyst stability at intermittently lean operation of the engine ($\lambda > 1$), as is customary in modern three-way concepts, and with high temperatures present at the same time.

The Pt/Pd catalyst of the invention, provided with a high cerium oxide contents exhibits considerably higher conversion rates in the dynamic test as well as a starting behavior which is considerably better than the reference example. The 50% conversions of CO, HC and NO$_X$, with values > 450° C. lie outside of the range of customary measurements and were therefore no longer detected.

EXAMPLE 9

A cylindrical honeycombed body of cordierite 102 mm in diameter, 76 mm long and with a cell density of 62 cells/cm$^2$ is coated by immersion in a 30% aqueous suspension containing aluminum oxide (140 m$^2$/g), cerium acetate and zirconium acetate.

The excess suspension is removed by being blown out with compressed air and the coated monolith dried at 120° C. This coating process is repeated, if necessary, in order to apply the desired amount of coating. The coated monolith is subsequently tempered 45 minutes at 600° C., during which time cerium acetate and zirconium acetate decompose to the particular oxides. The amount and the type of the oxides applied is indicated in Table 3.

The monolith coated in this manner is impregnated with an aqueous solution of PdCl$_2$ and H$_2$PtCl$_6$ containing Pd and Pt in a ratio of 1:5. The amount of noble metal applied is 1.1 g per catalyst.

The drying of the monolith impregnated with noble metal at 150° C. is followed by a two-hour reduction in forming gas (N$_2$:H$_2$ = 95:5) at 550° C.

EXAMPLE 10

A catalyst was produced according to Example 9 with the sole difference that the ratio of Pd:Pt was 3:1.

EXAMPLE 11

A catalyst was produced according to Example 9 with the difference that instead of cerium acetate, solid CeO$_2$ was used (obtained by thermal decomposition of cerium carbonate in air at 500° C.).

EXAMPLE 12

A catalyst was produced according to Example 9. The coating suspension contained nickel oxide.

EXAMPLE 13

A catalyst was produced according to Example 9. The coating suspension contained cerium acetate in a high concentration as well as rare earth (La:Nd:Pr = 61:21:8).

EXAMPLE 14

A catalyst was produced according to Example 11 with the sole differences that the catalyst contained no ZrO$_2$ and was not reduced.

EXAMPLE 15

A catalyst with a layered structure and dimensions, coating and noble metal content as described in Example 9 is produced as follows:

Two-thirds of the entire coating amount is applied in a first production cycle. The coated monolith is dried, tempered 45 min. at 600° C. in air and subsequently coated with a H$_2$PtCl$_6$ solution, dried and tempered at 500° C. in air.

In the second production cycle, the Pd-containing monolith is provided with the remaining third of coating, dried and tempered 45 min. at 600° C. It is subsequently impregnated with Pd(NO$_3$)$_2$ solution, dried and reduced in forming gas (5% hydrogen in nitrogen) for 2 hours at 550° C.

EXAMPLE 16

47 g $CeO_2$ are applied by impregnation onto 1 $dm^3$ of a ball-shaped carrier of $\gamma$-$Al_2O_3$ (particle diameter 2-4 mm, tamped density 560 $g/dm^3$, specific surface 105 $m^2/g$, pore volume 0.85 $cm^3/g$) prestabilized with 2% by wt. $La_2O_3/Nd_2O_3$ (La:Nd=2 L 1). The impregnation takes place in two steps by pouring on an aqueous solution of cerium acetate. A drying at 120° C. and a one-hour tempering at 500° C. take place after each impregnation step.

Subsequently, 1.2 g noble metal in the form of an aqueous solution of $Pd(NO_3)_2$ and $H_2PtCl_6$ are applied. The Pd and Pt are present thereby in a weight ratio of 2:5. After drying at 120° C. and a tempering in air at 450° C., the catalyst is reduced 1 hour at 550° C. with forming gas ($N_2:H_2=95:5$).

EXAMPLE 17

80 g $CeO_2$ and 10 g $ZrO_2$ are applied by means of two impregnations with the corresponding acetates onto 1 $dm^3$ of a ball-shaped $\gamma Al_2O_3$ (particle diameter 2-4 mm, tamped density 430 $g/dm^3$, specific surface 108 $m^2/g$, pore volume 1.08 $cm^3/g$). The drying conditions and tempering conditions corresponded to Example 16.

$Pd(NO_3)_2$ and $H_2PtCl_6$ were used for the following noble metal impregnation. The concentration of noble metal was 1.0 $g/dm^3$ catalyst, the weight ratio of Pd:Pt=7:1. After a drying at 120° C., the catalyst was reduced at 650° C. with forming gas ($N_2:H_2=95:5$).

EXAMPLE 18

The catalysts of Examples 9-17 were subjected in a fresh state and after a 12-hour thermal ageing at 800° C. in air to a technical application test with a synthetic exhaust mixture. To this end, cylindrical test specimens with a diameter of 25 mm and a length of 75 mm were bored out of the monolithic catalysts and measured in a test reactor at a space velocity of 50,000 $h^{-1}$ volumetrically equal amounts of the bulk catalysts were tested.

Test gas composition

| | |
|---|---|
| $CO_2$ | 14% by vol. |
| $O_2$ | 0.75 ± 0.75% by vol. |
| CO | 1% by vol. ± 1% by vol. |
| $H_2$ | 0.33% by vol. |
| $C_3H_6/C_3H_8$ (2/1) | 0.05% by vol. |
| NO | 0.1% by vol. |
| $H_2O$ | 10% by vol. |
| $N_2$ | remainder |

The dynamic test took place with a frequency of 1 Hz at 400° C. The starting behavior was measured at $\gamma=0.995$ for NO and at $\gamma=0.01$ for CO and hydrocarbons with a heating rate in each instance of 30° K./min.

The results of the testing of the catalytic activity are collated in Table 4.

TABLE 2
Comparison of the Catalytic Activity According to Examples 6 and 7

| | | Example 6 | Example 7 |
|---|---|---|---|
| Fresh State | | | |
| 50% Conversion | | | |
| $\lambda = 1.02$ | CO | 275° C. | 290° C. |
| $\lambda = 1.02$ | HC | 278° C. | 295° C. |
| $\lambda = 0.984$ | $NO_x$ | 330° C. | 292° C. |
| Dynamic Conversion | | | |
| $\lambda = 0.995$ | CO | 98% | 97% |
| | HC | 98% | 96% |
| | $NO_x$ | 98% | 97% |
| Aged 24 h 950° C. air | | | |
| 50% Conversion | | | |
| $\lambda = 1.02$ | CO | 383° C. | >450° C. |
| $\lambda = 1.02$ | HC | 383° C. | >450° C. |
| $\lambda = 0.984$ | $NO_x$ | >450° C. | >450° C. |
| Dynamic Conversion | | | |
| $\lambda = 0.995$ | CO | 80% | 6% |
| | HC | 90% | 8% |
| | $NO_x$ | 62% | 5% |

TABLE 3
Composition of the Catalysts of Examples 9-15

| Example | Coating Composition in grams per monolith | | | Ratio of noble metals in the active phase |
|---|---|---|---|---|
| | $Al_2O_3$ | $CeO_2$ | Other Additives | |
| 9 | 64 | 36 | 3.5 $ZrO_2$ | Pd:Pt = 1:2 |
| 10 | 63 | 36 | 3.5 $ZrO_2$ | Pd:Pt = 3:1 |
| 11 | 64 | 36 | 3.5 $ZrO_2$ | Pd:Pt = 1:2 |
| 12 | 66 | 36 | 8 NiO 3.5 $ZrO_2$ | Pd:Pt = 1:2 |
| 13 | 52 | 46 | 5 SE-Oxide* | Pd:Pt = 1:2 |
| 14 | 64 | 36 | — | Pd:Pt = 1:2 |
| 15 | 64 | 36 | 3.5 $ZrO_2$ | Pd:Pt = 1:2 |

*SE-Oxide = Rare Earth Oxides

TABLE 4
Starting Behavior and Pollutant Conversions in the dynamic test for catalysts of Examples 9-17

| Example | Starting Temperatures 50% Conversion at T° C. | | | Conversions in % at $\lambda = 0.995$ | | |
|---|---|---|---|---|---|---|
| | CO* | HC* | $NO_x$** | CO | HC | $NO_x$ |
| Fresh 9 | 192 | 221 | 200 | 99 | 98 | 99 |
| 10 | 198 | 224 | 205 | 99 | 99 | 99 |
| 11 | 185 | 210 | 190 | 98 | 99 | 99 |
| 12 | 195 | 218 | 199 | 99 | 99 | 99 |
| 13 | 205 | 230 | 212 | 97 | 96 | 97 |
| 14 | 186 | 212 | 194 | 97 | 99 | 99 |
| 15 | 196 | 224 | 204 | 99 | 99 | 99 |
| 16 | 223 | 246 | 238 | 96 | 97 | 98 |
| 17 | 231 | 256 | 241 | 97 | 96 | 98 |
| Aged 9 | 197 | 261 | 311 | 94 | 93 | 83 |
| 10 | 201 | 269 | 330 | 94 | 94 | 79 |
| 11 | 212 | 286 | 360 | 90 | 91 | 73 |
| 12 | 202 | 271 | 321 | 95 | 94 | 85 |
| 13 | 203 | 268 | 315 | 94 | 93 | 82 |
| 14 | 215 | 290 | 373 | 89 | 90 | 72 |
| 15 | 195 | 255 | 305 | 95 | 94 | 84 |
| 16 | 250 | 294 | 348 | 90 | 89 | 78 |

TABLE 1
Catalytic Activity of the Catalysts According to Examples 1-4

| Catalyst Example | Conversion at T° C. $\lambda = 0.995$ | | | | | | Conversion in % at $\lambda = 0.995$ | | | | | |
|---|---|---|---|---|---|---|---|---|---|---|---|---|
| | Fresh State | | | 100 h Engine | | | Fresh State | | | 100 h Engine | | |
| | CO | HC | $NO_x$ | CO | HC | $NO_x$ | CO | HC | $NO_x$ | CO | HC | $NO_x$ |
| 1 | 312 | 318 | 364 | 325 | 329 | 401 | 99 | 97 | 98 | 97 | 96 | 94 |
| 2 | 318 | 321 | 375 | 332 | 335 | 421 | 98 | 95 | 97 | 97 | 95 | 94 |
| 3* | 295 | 297 | 316 | 305 | 308 | 340 | 98 | 93 | 99 | 98 | 93 | 96 |
| 4* | 325 | 331 | >450 | 348 | 351 | >450 | 92 | 96 | 83 | 80 | 84 | 61 |

*Reference Example

TABLE 4-continued

Starting Behavior and Pollutant Conversions
in the dynamic test for catalysts of Examples 9-17

| Example | Starting Temperatures 50% Conversion at T° C. | | | Conversions in % at $\lambda = 0.995$ | | |
|---|---|---|---|---|---|---|
| | CO* | HC* | $NO_x$** | CO | HC | $NO_x$ |
| 17 | 246 | 288 | 337 | 92 | 91 | 81 |

*CO and Hydrocarbons at $\lambda = 1.01$
**NO at $\lambda = 0.995$

We claim:

1. A supported catalyst with an active phase applied to aluminum oxide of the transition series, said active phase consisting of 0.03-3% by weight palladium and platinum with a weight ration between palladium and platinum of 0.1:1 to 10:1;

said aluminum oxide having a cerium dioxide content of 25 to 50% by weight, whereby the weight amounts of noble metal, cerium dioxide and aluminum oxide constitute 100%, the active phase being present as a coating on a honeycombed, inert carrier support of ceramic or metal, the supported catalyst being obtained by a process comprising impregnating the aluminum oxide, optionally lattice-stabilized, with an aqueous solution of cerium salt and/or by mixing a cerium compound in solid form into the aluminum oxide to thereby obtain catalyst precursor A, tempering said catalyst precursor A deposited in said carrier support in air to 300°-700° C., depositing a first portion of said catalyst precursor A as an aqueous suspension in a first deposition step onto said inert carrier support thereby forming a first layer, impregnating said first layer with aqueous platinum salt solution, drying and optionally tempering said first layer, depositing a second portion of said catalyst precursor A as an aqueous suspension in a second deposition step onto said inert carrier thereby forming a second layer, impregnating said second layer with aqueous palladium salt solution, to thereby form a catalyst precursor B, drying and by finally tempering said catalyst precursor B at a temperature above 250° C., said tempering being optionally carried out in a gas stream containing hydrogen.

2. The catalyst according to claim 1, characterized in that up to 20% of the aluminum oxide is replaced by oxides of one or more of Zr, La, Nd, Pr and Ni.

3. The catalyst according to claim 1, characterized in that the cerium salt is cerium (III) acetate.

4. The catalyst according to claim 1, characterized in that the lattice stabilizer for aluminum oxide is alkaline earth metal oxide, silicon dioxide, zirconium dioxide or rare earth oxides.

* * * * *